(12) United States Patent
Scott et al.

(10) Patent No.: US 8,571,940 B2
(45) Date of Patent: *Oct. 29, 2013

(54) METHOD AND APPARATUS FOR EFFICIENTLY RESPONDING TO ELECTRONIC REQUESTS FOR QUOTE

(75) Inventors: Cheryl W. Scott, Austin, TX (US); Gunter Leeb, Austin, TX (US); David J. Reese, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,537

(22) Filed: Mar. 11, 2011

(65) Prior Publication Data

US 2011/0225062 A1    Sep. 15, 2011

Related U.S. Application Data

(63) Continuation of application No. 10/145,607, filed on May 10, 2002, now Pat. No. 7,908,200.

(51) Int. Cl.
   *G06Q 40/00* (2012.01)
(52) U.S. Cl.
   USPC ............................................ 705/26; 705/10
(58) Field of Classification Search
   USPC ........................................ 705/10–44
   See application file for complete search history.

(56) References Cited

U.S. PATENT DOCUMENTS

| | | | | |
|---|---|---|---|---|
| 5,842,178 A * | 11/1998 | Giovannoli | ................... | 705/26.4 |
| 5,897,621 A * | 4/1999 | Boesch et al. | ............. | 705/26.82 |
| 5,905,975 A * | 5/1999 | Ausubel | .......................... | 705/37 |
| 5,950,177 A * | 9/1999 | Lupien et al. | ................... | 705/37 |
| 5,970,470 A * | 10/1999 | Walker et al. | .............. | 705/14.27 |
| 6,002,854 A * | 12/1999 | Lynch et al. | ...................... | 703/1 |
| 6,418,415 B1 * | 7/2002 | Walker et al. | ................ | 705/26.2 |
| 6,651,217 B1 * | 11/2003 | Kennedy et al. | .............. | 715/224 |
| 6,675,292 B2 * | 1/2004 | Prabhu et al. | ................. | 712/244 |
| 6,725,257 B1 * | 4/2004 | Cansler et al. | ................ | 709/219 |
| 6,778,968 B1 * | 8/2004 | Gulati | ......................... | 705/36 R |
| 6,901,430 B1 * | 5/2005 | Smith | ........................... | 709/206 |
| 6,920,431 B2 * | 7/2005 | Showghi et al. | ................ | 705/15 |
| 6,928,411 B1 * | 8/2005 | Fox et al. | ....................... | 705/1.1 |
| 6,980,963 B1 * | 12/2005 | Hanzek | ....................... | 705/26.62 |
| 7,069,237 B1 * | 6/2006 | Tate | ............................. | 705/26.41 |
| 7,165,041 B1 * | 1/2007 | Guheen et al. | ............... | 705/26.1 |
| 7,272,639 B1 * | 9/2007 | Levergood et al. | ........... | 709/218 |
| 7,353,192 B1 * | 4/2008 | Ellis et al. | ..................... | 705/26.5 |
| 7,512,548 B1 * | 3/2009 | Bezos et al. | ................. | 705/26.1 |

* cited by examiner

*Primary Examiner* — Frantzy Poinvil
(74) *Attorney, Agent, or Firm* — Terrile, Cannatti, Chambers & Holland, LLP; Kent B. Chambers

(57) ABSTRACT

Embodiments of the components and processes for recording selected Web site data described herein adhere to long-term stability guidelines so as to improve maintainability and viability over time. Additionally, the data recording components can be placed within a software architecture to minimize the number of redundant data recording components. Furthermore, the data recording components can be tailored to specific data recording purposes. Additionally, the data recording components can be designed to take into account system performance issues and minimally impact system performance. Furthermore, the data recording components can be tailored to gather specific data useful for various analytical processes. Additionally, embodiments of the data recording components are relatively easy to implement and able to handle idiosyncrasies and changes of various Web sites in which they are placed.

14 Claims, 5 Drawing Sheets

METHOD AND APPARATUS FOR EFFICIENTLY RESPONDING TO ELECTRONIC REQUESTS FOR QUOTE

CROSS-REFERENCE TO A RELATED U.S. PATENT APPLICATION

This application is a continuation of application Ser. No. 10/145,607, filed May 10, 2002, now U.S. Pat. No. 7,908,200, which relates to application Ser. No. 09/571,792, filed on May 10, 2002, entitled "Method and Apparatus for Processing Requests for Quotations" and naming Gunter Leeb Cheryl W. Scott and David J. Reese as inventors, and commonly assigned with application Ser. No. 10/145,607. Both of these applications are incorporated herein by reference in their entireties.

BACKGROUND OF THE INVENTION

1. Field of the Invention

The present invention relates to methods and apparatus for efficiently generating and responding to electronic requests for quote.

2. Description of the Related Art

Choosing and purchasing products today is a time consuming and difficult task for buyers, especially corporate buyers who are responsible for purchasing large amounts of information technology (IT) equipment (e.g., desktop computers, laptop computers, servers, software, etc.). Buyers of IT equipment must spend a large amount of time accessing a variety of different sources through a variety of means to research the equipment they need and the merchant from which they want to buy. To obtain the desired products at the least cost with the right service options, the corporate buyer typically requests quotes from various merchants, and subsequently selects the most competitive of the quotes. To this end, the buyer prepares a general list of products wanted along with other information (e.g., delivery date), and sends the list to a number of merchants via either fax, e-mail, or regular mail. The merchants, in response, generate quotes which are returned to the buyer via e-mail, fax, or regular mail.

As discussed, the generating of requests for quotes and responses thereto is a very time consuming practice. This is even the case if the requests and/or responses are prepared electronically, as a user must manually obtain and enter the desired information.

SUMMARY OF THE INVENTION

The present invention relates to a system, a method, or carrier medium comprising instructions executable by a computer system for efficiently generating and responding to electronic requests for quote ("RFQ"). As used herein, the term "RFQ" is understood to include, but not be limited to, request for quote, request for bid, request for services, request for data/information, request for proposal, and the like, and is not to be limited to the more limiting, general commercial use of "RFQ," i.e., a request for quote.

The term "system" as used herein generally describes hardware components that in combination allow the execution of software programs or algorithms. Hardware generally includes a processor, memory medium, and input/output (I/O) devices. As used herein the term "processor" generally describes the logic circuitry that responds to and processes basic instructions contained in a memory medium. The term "memory medium" includes an installation medium, e.g., a CD ROM, or floppy disks; a volatile computer system memory such as DRAM, SRAM, rambus RAM, etc.; or a non volatile memory such as optical storage or magnetic medium, e.g., a hard drive. The term "memory" is used interchangeably with "memory medium" herein. The memory medium may comprise other types of memory or combinations thereof. In addition, the memory medium may be located in a system in which the software programs are executed, or may be located in a second system that connects to the first system over a network. In this later instance, the second system provides the program instructions to the first computer for execution.

Systems may take various forms. In general, systems can be broadly defined to encompass any device having a processor that executes instructions from a memory medium. Instructions for implementing the present invention on a system can be received by the system via a carrier medium. The carrier medium may include the memory media or storage media described above in addition to signals such as electrical or electromagnetic signals, conveyed via a communication medium such as a network and/or wireless link.

FIG. 1 shows a network of computer systems. More particularly, FIG. 1 shows a network having several client computer systems or terminals 2 through 8 coupled to server computer systems 10 and 12 via the Internet. One or more of the servers 10 and 12 and terminals 2 through 8 may include a database. It is to be understood that in example embodiments more or fewer client and server systems may be present.

The present invention in one embodiment permits a user, who may be a buyer (including an individual) involved in any part of a channel of distribution of particular goods and/or services, to automatically create and deliver an electronic RFQ to one or more preselected merchants. By use of the system, a user can often save significant time, expense, and resources typically incurred in creating and delivering an RFQ. In an example embodiment, in an instant RFQ system, the RFQ is automatically generated based on the product(s) and quantities selected by the user, preselected user preferences, and/or system preferences and business rules.

As used herein, the terms "automatically" and "instant" both mean that a requested activity (i.e., the generation of an RFQ or a response thereto) is performed by a computing means with minimal or no involvement by a user. It is to be understood that such instant or automatic RFQ generation is distinguished from manual creation of an RFQ electronically, such as described in co-pending application Ser. No. 09/571, 792, referenced above. In such a manual process, a user creates an RFQ via a user interface or the like by manually entering data or selecting from menus (e.g., pull-down lists or the like) into an electronic RFQ form.

The instant RFQ may be generated from any website or location from which a user desires to access the instant RFQ function. For example, a user may be viewing a website of an retailer (i.e., a retailer of products sold or licensed via the world wide web or its successors ("Web")) relating to a particular computer or other product. As used herein, the term "product" is defined broadly to encompass goods, services, information, and other things that may be sold, licensed or otherwise provided or transferred. Using the methods disclosed herein, the user can simply click on an "Instant RFQ" or similar function button available on the website or perform other user activated operations to select a product, and the system will automatically configure and deliver an RFQ to merchants for the selected product in accordance with the user preferences.

Further, in example embodiments, a response to an RFQ (otherwise known as a "quote") may be prepared and delivered automatically, without need for any interaction by a merchant. In other embodiments, a response may be prepared and delivered efficiently by a system in which certain portions of the response may be instantly prepared by autopopulation or the like. By use of the system and methods disclosed herein, a seller, who may be a merchant of goods and/or services and/or information in any part of a channel of distribution for such goods/services/information, may efficiently respond to an electronic RFQ.

In an example embodiment, the methods disclosed herein may be used in connection with a global computer network, such as the Internet or other such network, in which a plurality of buyers and sellers interact. In an example embodiment, the buyers and sellers may be interconnected to a central system, such as a server computer (e.g., through an application service provider ("ASP") or the like) as shown in the example network of FIG. 1. The central system may be used as a central clearinghouse/manager with regard to the processing of RFQs and responses thereto.

A more detailed discussion of an example architecture of such a system is disclosed in the application referred to above, entitled "Method and Apparatus for Processing Requests for Quotations" filed on the same date as the present application.

In use of such a system, a buyer may send an RFQ, which may be generated using the methods disclosed herein, electronically to a group of sellers. Upon receipt of the electronic RFQ, a merchant may then use the methods disclosed herein to respond to the RFQ efficiently.

In an example embodiment, a user may first configure a profile to reflect that user's preferences or accept a default profile with regard to efficiently creating RFQs. Such a configuration process may include responding to a series of fields within a user interface or the like. In an example embodiment, this user profile may be stored at a central location or alternately, it may be stored at the user location or any other place accessible to the RFQ system.

When the user finds a product or products for which he seeks to develop an RFQ, the user may select the automatic RFQ function. In an example embodiment, the user may locate the product(s) via a website (such as an electronic marketplace or manufacturer's or retailer's site) using a web browser or the like, or may locate the product in an electronic database to which he has access through an online service or application software on his computer. In certain embodiments, the user may access the website of an application service provider (ASP), which provides access to one or more product databases from which to select products. Further, such a website may have a list, such as a pull-down menu showing the various products potentially available.

The user may select the automatic RFQ function in a number of ways, such as by selecting an "Instant RFQ" button or the like available in conjunction with a list of products in an electronic marketplace, on the manufacturer's or retailer's website, or the user may alternately access the ASP's website, which performs the instant RFQ function. Upon selection, the system will access the buyer profile, and an RFQ will be efficiently configured using the information stored therein. Alternately, the profile may be supplied to the system (together with the product selection) from the user's computer or the system may request the information from a remote database or another system to collect the user's profile. In certain embodiments, a buyer may choose to have only part of the RFQ prepared automatically, and the buyer will actively create or edit part of the RFQ before delivery. In other embodiments, a buyer may choose an option between these two extremes, such as selecting to approve an automatically prepared RFQ before it is delivered. In an example embodiment, a buyer may view the RFQ before it is delivered.

A similar process may be performed on the seller's side of the instant RFQ system. In an example embodiment, a merchant operating a workstation may first configure a profile to reflect that merchant's preferences with regard to efficiently responding to RFQs. Such a configuration process may include responding to a series of fields within a user interface or the like. Upon completion, this merchant profile may be stored at a central location (e.g., a server computer) or it may be stored at the merchant workstation (or both).

When RFQs are then directed to the merchant (which may be via a central server, as discussed above, or via an email to the merchant's workstation), the merchant profile will be accessed, and a response will be efficiently configured using the information stored therein. In certain embodiments, a merchant may choose (based on its profile) to have the entire response process performed automatically, that is, the response may be generated and delivered electronically, without the merchant even being aware of the presence of the RFQ. Alternately, a merchant may choose to have only part of the response prepared automatically, and the merchant will actively create or edit part of the response before delivery. In other embodiments, a merchant may choose an option between these two extremes, such as selecting to approve an automatically prepared response before it is delivered.

Thus, using the methods and system disclosed herein, a buyer and seller may efficiently generate and respond to an electronic RFQ via a network of interconnected computers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Referring again to FIG. 1, a large area network, such as the Internet, includes a plurality of networked "servers" 10 and 12 that are accessible by "client terminals" 2 through 8. Communication between the servers 10 and 12 and the client terminals 2-8 typically occurs over a publicly accessible network, such as a public switched telephone network over asynchronous digital subscriber lines ("ASDL") telephone lines, or large bandwidth trunks, such as T1 or OC3 service. The client terminals 2-8 access the various servers 10 and 12 through an Internet service provider, e.g., America On-Line, Prodigy, CompuServe and the like, by executing application specific software, commonly referred to as a "browser", on a workstation, such as computer 14, shown more clearly in FIG. 2.

Figure 2:
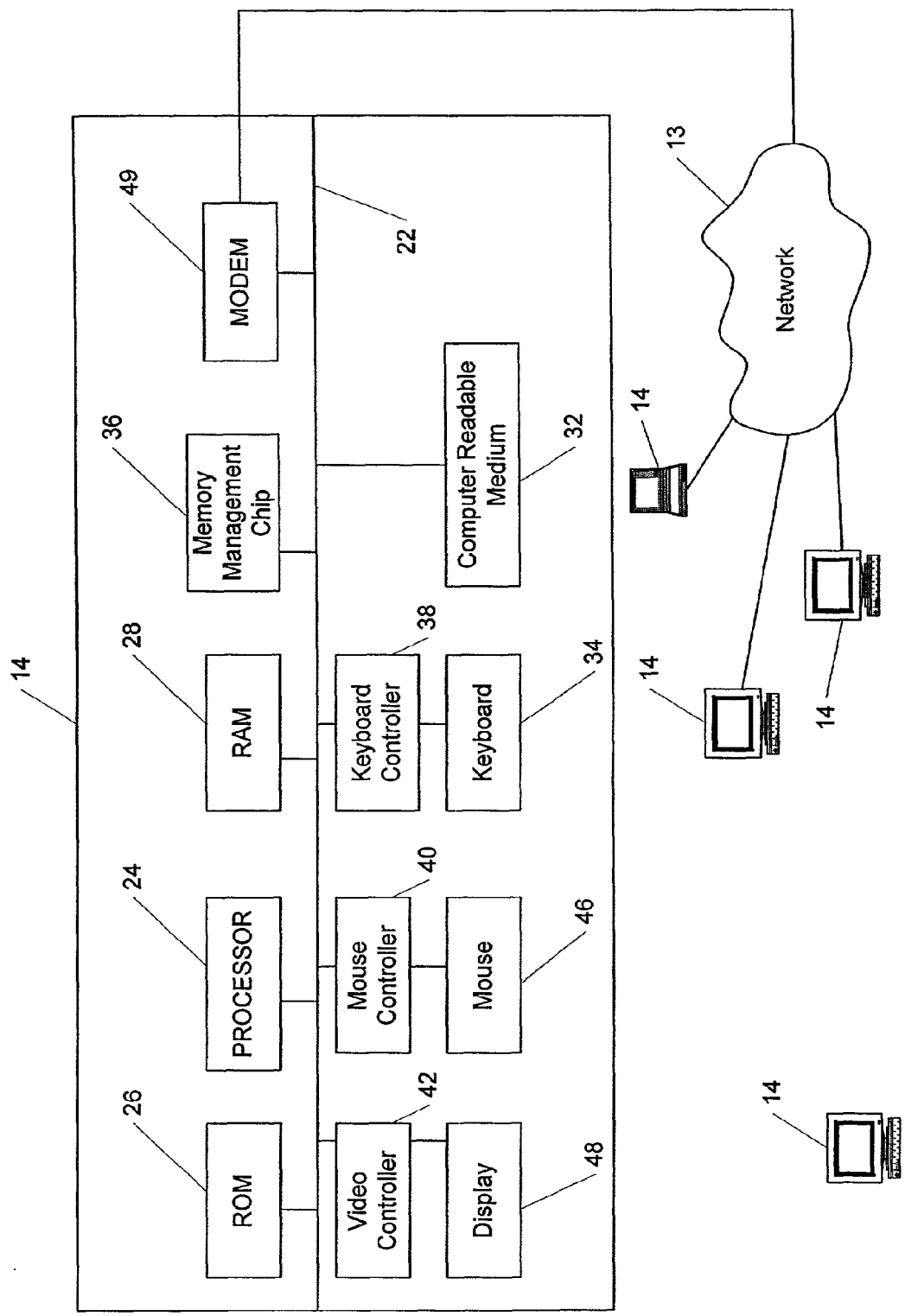
FIG. 2 is a block diagram of a computer system.

Referring to FIG. 2, an exemplary computer system 14 that may be associated with the servers 10 and 12 and client terminals 2-8 has one or more system buses 22 placing various components of the system in data communication. The system bus 22 allows data communication between processor 24 and both a read only memory (ROM) 26 and random access memory (RAM) 28. The ROM 26 contains among other code, the Basic Input-Output system (BIOS) which controls basic hardware operation, such as the interaction with peripheral components such as keyboard 34. Applications resident with a computer system 14 are generally stored on and accessed via a computer readable medium 32, such as a hard disk drive, optical drive, floppy disk drive, compact disk, or other storage medium. Additionally, applications may be in the form of electronic signals modulated in accordance with the application and data communication technology when accessed via a network.

The RAM 28 is the main memory into which the operating system and application programs are loaded and generally affords at least 32 megabytes of memory space. Through data communication on system bus 22, memory management chip 36 controls direct memory access (DMA) operations. DMA operations include passing data between the RAM 28 and the mass storage memory 32. Also in data communication with the system bus 22 are various I/O controllers: a keyboard controller 38, a mouse controller 40 and a video controller 42. The keyboard controller 38 provides a hardware interface for the keyboard 34, the mouse controller 40 provides the hardware interface for a mouse 46, or other point and click device, and the video controller 42 provides a hardware interface for a display 48.

A modem 49 or network circuitry (not shown) enables networked computer systems 14 to communicate data over a network via any of various data communication technologies such as digital subscriber lines ("DSL"), ADSL, ISDN, or ordinary telephone lines. The operating system of the computer system 14 may be WINDOWS 98, UNIX, or any other known operating system. The RAM 28 also supports a number of Internet access tools, including, for example, an HTTP-compliant Web browser having a JavaScript interpreter, such as Netscape Navigator, Microsoft Internet Explorer, and other similar browsers.

Figure 1:
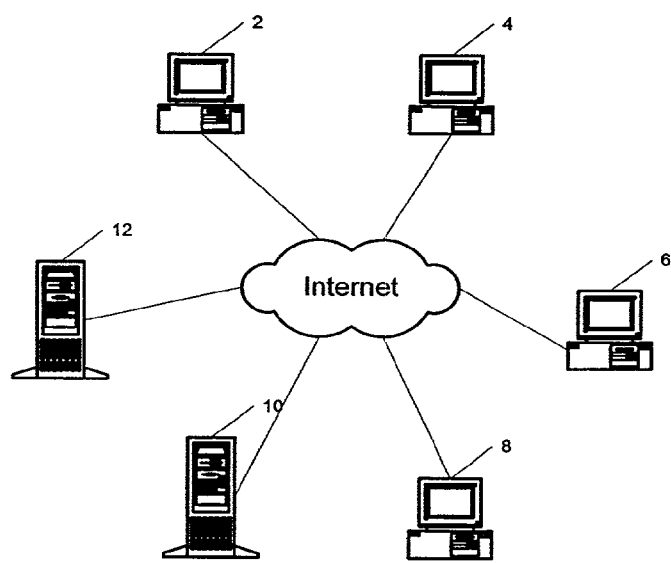
FIG. 1 shows a block diagram of a network of interconnected computers.

The architecture discussed in FIGS. 1 and 2, and discussed more fully in the co-pending application entitled "Method and Apparatus for Processing Requests for Quotations," referenced above, may be used to create and respond efficiently to RFQs using the methods disclosed herein.

Figure 3:
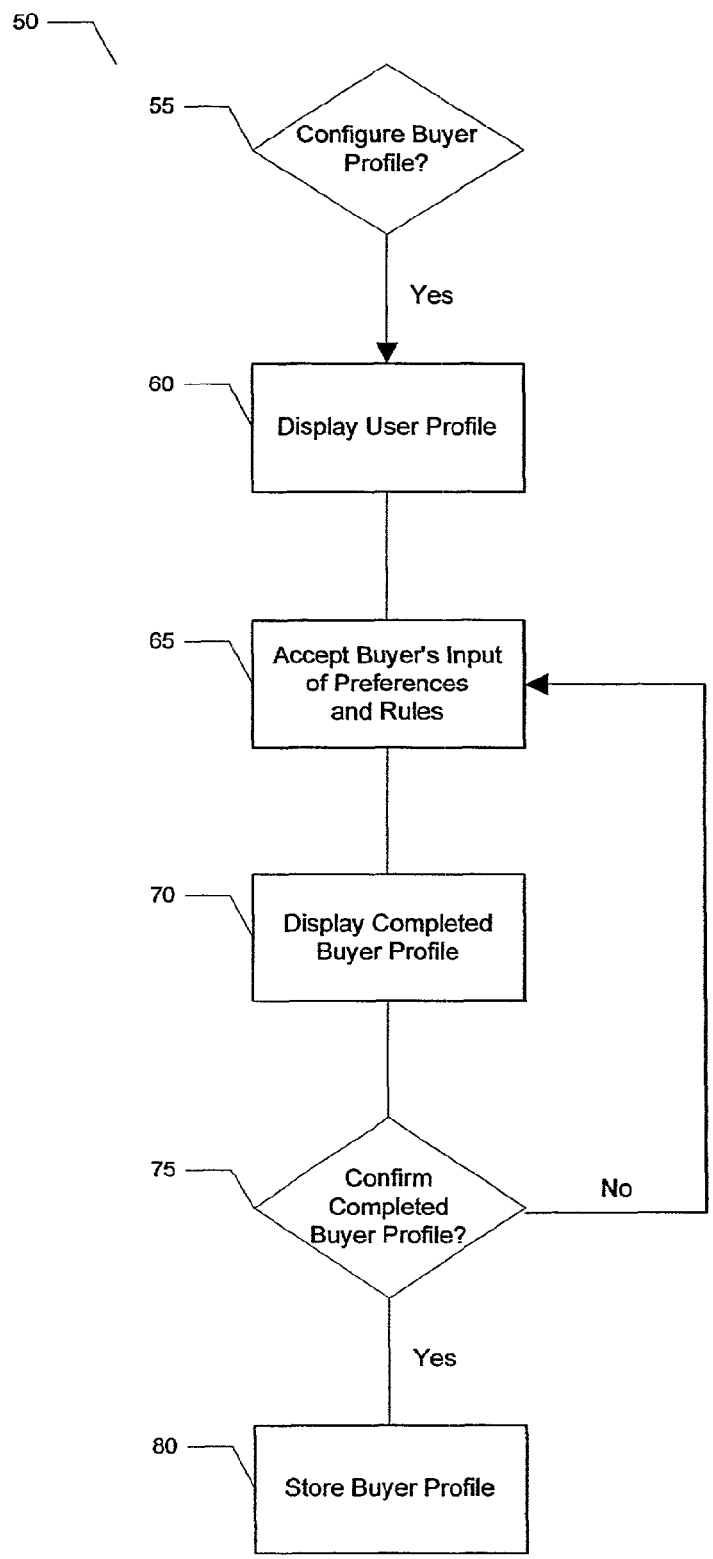
FIG. 3 is a flow chart of an example configuration method to configure a buyer profile.

To efficiently create RFQs, a buyer may first create a buyer profile, indicating preferences that govern creation of RFQs. FIG. 3 is a flow chart of an example embodiment of a process for generating a buyer profile. As shown in FIG. 3, a buyer may choose to configure a profile at step 55. In an example embodiment, this buyer profile may be created by a user's responses to inquiries displayed via a user interface, which may be accessible via a website, user-loaded software, or other such electronic means, or the profile may be created manually by filling out a questionnaire or sending an email or via telephone to a call-center or the like, to enter the information into the system. Thus, in step 60, the user interface is displayed to the user.

In an example embodiment, the user interface may contain a plurality of fields for selection of various preferences. The fields may be set up for open-ended responses (such as name and address fields) or may seek closed responses, such as through the use of click-down menus or other selection of preexisting responses. In various embodiments, the number and type of such fields may vary considerably. The user provides responses to the various preferences and rules, which are accepted by the system at step 65.

An example embodiment may include the following fields, which are discussed in detail. A first group of fields may relate to identification fields for the buyer. Included in such identification fields may be information relating to the buyer (organization), such as company size, growth/revenue, business type, buying history, tax status (e.g., non-profit) and the like. Of course, it is to be understood that individual buyers may also generate buyer profiles configured for their purposes.

A second group of fields may relate to user preferences in creating the instant RFQ. These preference fields may relate to various items typically present in an RFQ, such as a merchant list, days until the due date, default service requirements, days prior to sending the RFQ, days until delivery after an order, and the like. In example embodiments, the choice of which merchants to send the RFQ to may be based on various criteria. For example, a buyer may want to send the RFQ to all merchants in the system, or the buyer may manually create a preferred merchant list. Alternately, an automatically generated preferred merchant list (e.g., ranking by the system) may be adopted. Other criteria in selecting merchants may include, for example, distance between buyer and seller, buying history of buyer, a seller's product spectrum, seller qualifications and service offerings (e.g., authorizations), product category and seller's specialization, and product availability. Thus, the user may select one or more of these or like criteria in determining what merchants will be selected for receiving an RFQ.

Additional fields relating to a buyer's preferences may include a due date for bids, which in an example embodiment may be a pre-selected number of days into the future. Further, a user's service requirements, such as the level of technical support needed for computer equipment (i.e., on-site support, call center, 24/7, etc.) may be selected. Further fields may include notification messages (user defaults), and additional user information and comments (to be included in a notification message, which will be discussed below).

After completing the buyer profile, the system may display the completed profile to the user at step 70. Then at step 75, the user may confirm that all information is correct. Then, at step 80, the profile is stored so that it may be accessed for use in creation of an instant RFQ. In example embodiments, the profile may be stored in a central location, such as a central server, so that it may be accessed in operation of the system. Alternately (or in parallel), the profile may be stored in the remote user's workstation, for access in embodiments in which the instant RFQ process is run from an application loaded on the user's workstation. Furthermore, the remotely stored profile may be accessed via the Internet or other global computer network as a type of "cookie" file indicative of the user's preferences or in other such manner.

It is to be understood that wherever the buyer profile is stored, it may be accessed by the buyer at any time in order to edit or modify any of the fields (or add additional fields), based upon the buyer's then-current preferences.

Figure 4:
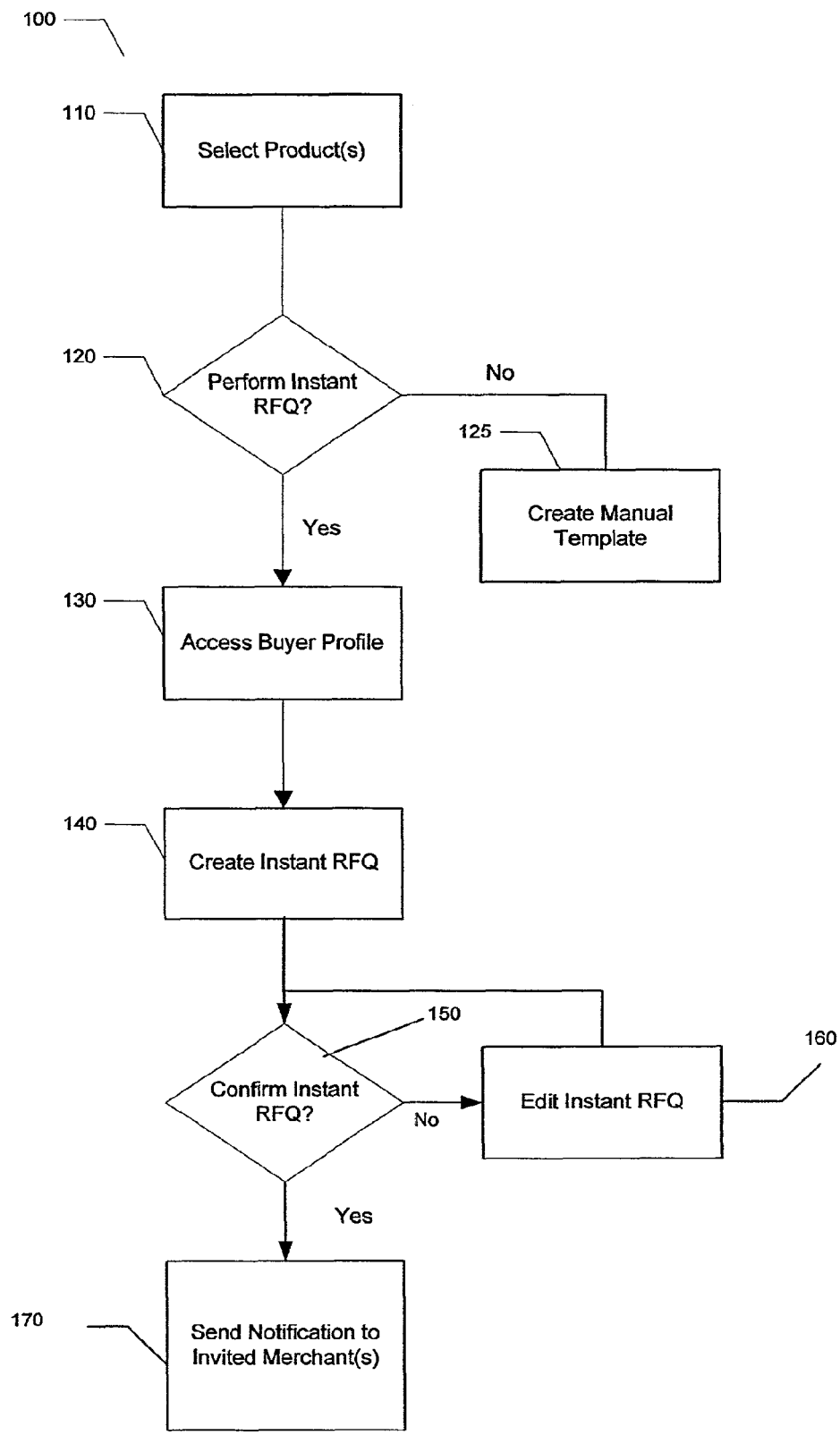
FIG. 4 is a flow chart of an example automatic RFQ process.

In operation of an example embodiment of an instant RFQ process 100, the user starts the instant RFQ process by selecting one or more products and choosing to create an instant RFQ, as shown in FIG. 4 at steps 110 and 120. The user may access the products via various sources, as discussed above, such as a website, database, or other collection of products. (It is to be understood that if an automatic RFQ is not selected, a manual template may be provided for the user at step 125.) As discussed above, there may be a button, clickable icon or the like for the user to instruct the system to create the RFQ. Also, a user may select the automatic option from a menu or by command line. For example, an "instant RFQ" button may be next to a product line item from catalog search results or on a shopping cart type screen. Upon the command to create an instant RFQ, the buyer's profile will be accessed at step 130. Then, based on the product(s), buyer profile, and system rules (and merchant rules, as needed), the RFQ is automatically created at step 140. In an example embodiment, the generation may occur at a central server location, such as an ASP's server. However, it is to be understood that in other embodiments the operation may occur elsewhere.

In an example embodiment, the instant RFQ will be displayed on the user's workstation in a user interface, in which the selected product(s), applicable preferences and a changeable quantity field are displayed back to the user for confirmation. Also, the instant RFQ contains an RFQ identification, which may be a simple number or a more descriptive term generated from the products requested in the RFQ, send date and the like. An embodiment may also display details of when and where results can be compared.

It is to be understood that described herein are example process steps rather than alternatives. Business rules and system design may leave out certain steps and in some cases change the order.

In operation, the merchant lists to whom the instant RFQ will be delivered is configured by the system based on the preferences set in the buyer's profile. In addition, system preference rules, business rules, and merchant preferences will be analyzed by the system in creating a merchant list. These rules may include:

1. selecting all merchants known to the RFQ system;
2. removing sellers that will not deliver to the buyer (e.g., different sales area, out of distance, wrong organization type, etc.);
3. removing sellers that are out of distance to the buyer (based upon the preselected user preference);
4. merging the user's list of unconditional preferred merchants;
5. removing sellers not selling products from the requested category;
6. removing sellers that will not do business with the buyer based on the user's profile;
7. removing sellers that do not meet the requested qualifications (e.g., merchants not having 24 hour tech support); and/or
8. removing sellers that do not have the product available.

Further, the system may sort the remaining merchants in the list based on seller ranking (user preference specifies sort criteria, e.g., most bids awarded, most responses, highest volume, industry awards, seller size, and the like). Additionally, the system may prepend the user's list of unconditional preferred merchants (if present in the buyer's profile). Finally, in example embodiments, the system may have a preselected maximum number of merchants to whom an RFQ will be delivered and if so, the system will trim the merchant list to the system set maximum.

Further, the system inserts other fields from the user profile and system preferences, such as due date (which may be generated from the days until due date value in the buyer's profile), service requirements, send date and additional information. Upon completion of the instant RFQ, the system will seek confirmation from the buyer that all of the information is correct at step 150. The buyer may confirm the RFQ by a single click (i.e., selecting a "Confirm" or "Send" button on the RFQ). If the buyer does not confirm the RFQ, he may edit it at step 160.

The system then sends notifications to the invited merchants regarding the RFQ at step 170. This notification may take different forms in various embodiments. In one example embodiment, the notification may include the RFQ itself, and may be sent via e-mail directly to a representative of the merchant, sales people of the merchant organization, or subset or the like. Alternately, the notification may be an e-mail containing a clickable uniform resource locator (generally known as "URL"), providing the merchant with a way to access the RFQ at a specified location (which in an example embodiment may be a central location of an ASP) via the Internet or other computer network where buyers and sellers are connected. Other means of notification may include notifications on the site, pop-up messages in user-loaded software, fax, pager, voice mail, call, and the like. The system rules or the seller's preferences may also state that the user does not receive notifications.

In certain embodiments, a merchant who receives an electronic RFQ (generated automatically or manually) may choose to respond automatically (without even being aware of the presence of the RFQ) in a manner similar to that discussed above in connection with generating an RFQ.

To be able to efficiently bid or respond to RFQs, a merchant may first create a merchant profile in a similar manner as discussed above in connection with FIG. 3, indicating preferences to be following in efficiently responding. In an example embodiment, this merchant profile may be created by a user interface, which may be accessible via a website, user-loaded software, or other such electronic means. Alternately, the profile may be created manually, by filling out a questionnaire or the like, or via contacting a call center (via telephone, email, fax, mail, etc) which enters the information and/or makes it accessible to the system. If obtained via a website, the user interface may be in HTML format or other such markup language.

In an example embodiment, the user interface may contain a plurality of fields for selection of various preferences. The fields may be set up for open-ended responses (such as name and address fields) or may seek closed responses, such as through the use of click-down menus or other selection of preexisting responses. In various embodiments, the number and type of such fields may vary considerably.

An example embodiment may include the following fields, which are discussed in detail. A first group of fields may relate to identification fields seeking name and address information. Additionally, fields may be present to describe in detail that merchant's business operation, such as level in a distribution channel (i.e., manufacturer, distributor, value-added reseller, and the like), and a merchant's authorization status (such as whether the merchant is authorized to sell and/or service a particular brand of computer equipment).

Another group of fields may include rules-based analysis of situations in which and how a merchant desires to implement an automatic or other efficient response. More specifically, in an example embodiment, such rules may include:

1. rules for rejecting an RFQ (and approving the rejection);
2. rules when an automatic reply should be used;
3. rules when a user needs to approve a reply;
4. rules for creating the reply (i.e. filling in the values (e.g. price)); and
5. rules for rejecting a reply after the reply has been generated.

Further, these rules may include a determination of whether and at what preselected threshold a merchant desires to deliver automatic responses (that is, a response will be prepared without any interaction by the merchant). For example, a merchant may provide a preselected transaction amount below which the merchant desires a response to be prepared automatically. Further, there may exist a lower threshold below which a merchant chooses to reject an RFQ or not to respond whatsoever.

Alternately, the merchant may select a transaction amount above which it may choose to review and approve automatically generated responses. In yet other embodiments, the merchant may choose to have a partially automated response process in which certain information is automatically generated, and other information is entered by the merchant. Other rules fields may include how to analyze a buyer business profile, quantity of goods/services requested, and the like.

Another group of fields may relate to selection of preferences in automatically responding. These fields may include rules to determine where the merchant will obtain the product in question. For example, a merchant may obtain its goods from a variety of different suppliers or distributors, depending on variables relating to pricing, availability, delivery, location, and the like. In this supplier field, the merchant may select one or more suppliers from which it will obtain the products that are the subject of the RFQ. For example, a merchant typically has prearranged business relationships with one or more distributors. It is to be understood that in operation, the system may then use this supplier field to automatically seek and obtain price and availability information regarding the product from the one or more suppliers selected by the merchant. In example embodiments, the system may obtain this information from a central database, or alternately, the system may obtain real-time information from the supplier or suppliers via the Internet or other computer network.

Yet another preference field may be rules relating to how to choose between more than one supplier, assuming that the multiple suppliers have the same product. Preferences relating to the choice of supplier may include lowest price, availability, history, location, and the like. Further, a preference field may exist to select a preferred distributor based on history, price, or availability, meaning that the system will obtain price and availability information from only that distributor. In an embodiment in which ease of processing is desired, a single preferred distributor will typically be selected by the merchant. In certain embodiments, the seller may choose to inform the distributor regarding the buyer's interest in the particular product(s) and quantity. Further, in an example embodiment, the merchant may select a distributor from a preferred distributor list, in which the system will select a preferred distributor, so long as the cost is not more than a preselected percentage above the lowest cost distributor (or select the cheapest distributor from the list of preferred distributors).

Another preference field may be the expected delivery date, which may be selected to be a preselected time after acceptance of the response, on an "in stock" basis, or other such basis. Another preference field may be whether the merchant chooses to substitute another product for the requested product, which may be performed on a comparison with the RFQ product based on attributes of the products, their cost, ranking and availability of the products (i.e., from the respective products' datasheets). However, in example embodiments, the system or buyer may override any such substitution by stating that no substitutions are permitted.

A further preference field may relate to a determination of pricing in responding to the RFQ. For example, the selections for pricing preference may be a merchant's list price or a preselected mark-up or margin over the cost basis obtained from the supplier, and whether the margin varies from supplier to supplier or buyer. Additionally, the margin may vary depending on product/category. In example embodiments, the mark-up may be a fixed markup, or may be a percentage with or without a minimum mark-up, and may include discounts or increases based on buyer and/or quantities, special agreement with the buyer, and/or total price. It is to be understood that for certain quotes, a merchant may select a margin that is zero or even negative.

Additional fields may relate to other information to be provided in a quote, such as the date until when the quoted price is valid, additional shipping/handling charges, taxes, shipping alternatives, and the like. It is to be understood that in certain embodiments, more or fewer fields may be present for creating a merchant profile. For example, automatic product substitutions, quantity adjustments, and the ability to up-sell/cross-sell other products may be available to be selected by a merchant.

As discussed above, upon completion of the profile, it may be stored in one or more locations for access in efficiently responding to RFQs. These locations may include a merchant database of a central server, a merchant workstation, and the like. At a later time, the merchant may access the profile to modify any of the fields, add additional information, and the like.

In operation of the efficient response process, the RFQ system receives an electronic RFQ via the network directed to the merchant by the buyer. The buyer may select the merchant as a result of choosing the specific merchant, or by selecting the merchant as part of a group of merchants. For purposes of this discussion, it will be assumed that the RFQ goes to a central server for processing and delivery. However, it is to be understood that the merchant or another third party may perform the efficient response process at a location other than a central server.

As discussed, the RFQ may have a plurality of fields, including a product identification code, which may be a SKU number, name, or other such identifier. Other information is typically included in an RFQ, such as quantity, delivery requirements, comment field, and the like.

Figure 5:
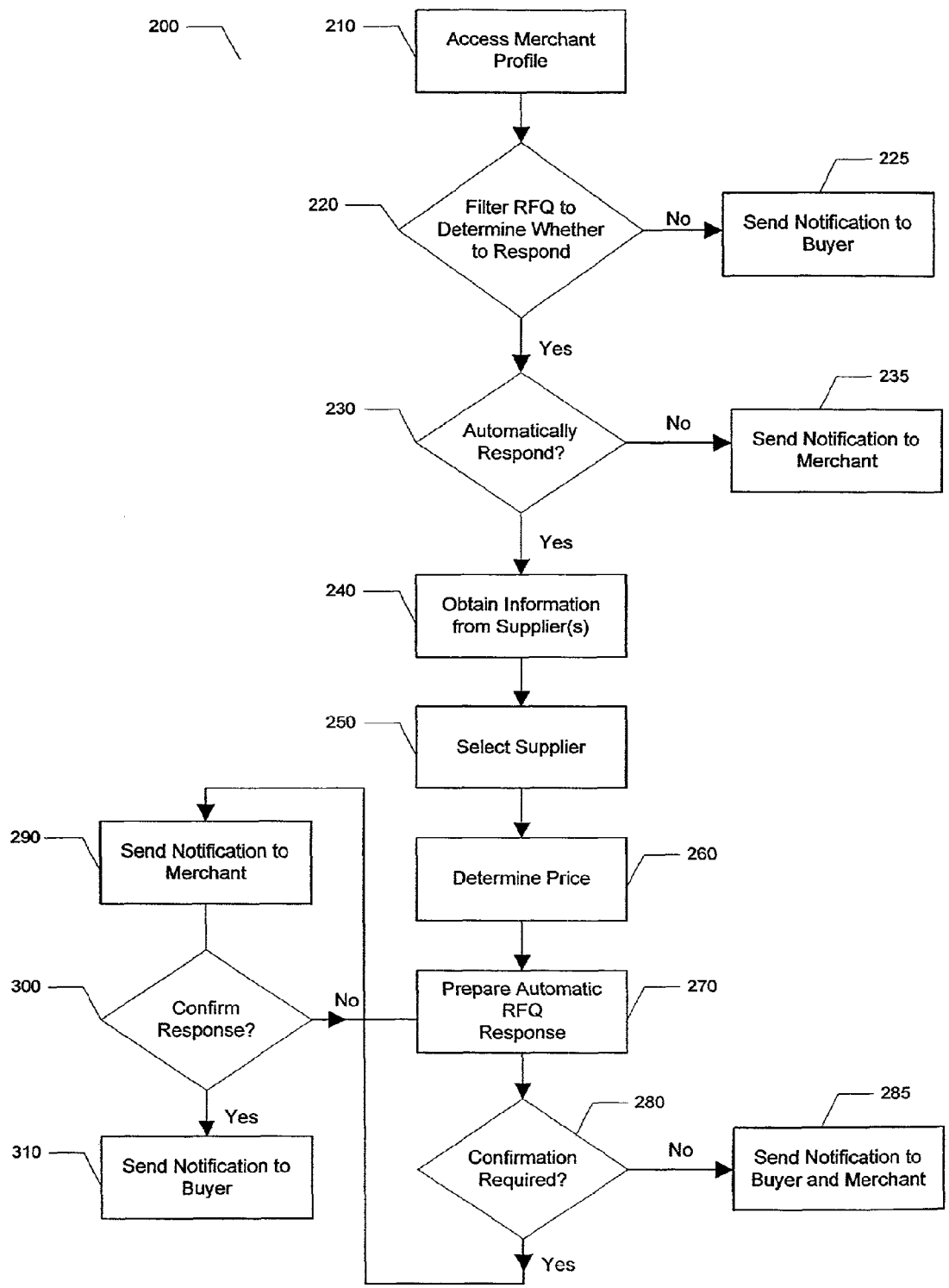
FIG. 5 is a flow chart of an example automatic RFQ response process.

FIG. 5 is a flow chart of an example automatic quote response process. As shown in FIG. 5, upon receipt of the RFQ, the server will access the merchant profile corresponding to the requested merchant from the merchant database or other such location at step 210. Next, the server analyzes the various fields within the RFQ to the rules and preferences of the merchant and its profile. If not done when creating the RFQ, upon receipt of an RFQ, it is first checked to automatically determine whether a bid will even be generated for the RFQ based on the merchant profile. This determination is the reverse of the merchant selection steps described above, but is controlled by the seller instead of the buyer. On the buyer's side, this determination is a filtering process in which the RFQ is first implicitly filtered based upon information contained in the merchant profile. Such information may include that the merchant does not sell the requested products, or the merchant does not want to do business with the particular buyer (or class of buyers). This type of filtering may be called implicit filtering because it is performed on the buyer side of the process, and accordingly, is unnoticeable to the seller.

Additionally, explicit filtering is performed on an RFQ, in which the RFQ is automatically rejected based on a seller's preferences. Examples of reasons why a seller may choose to reject an RFQ include: a minimum quantity is not met; an expected total revenue is below a predetermined limit; the seller does not have the product(s) in stock; the seller cannot get the product from its preselected distributors; or cannot receive the products from distributors in time (e.g., because they are backordered with the distributors). Other reasons for rejecting an RFQ may include that the buyer is not in the seller's predefined delivery area, or does not have the services requested, or is part of a special list of buyers to reject. Collectively, the implicit and explicit filtering are shown at step 220 of FIG. 5. If no bid will be forthcoming from the seller, a notification will be sent to the buyer at step 225. If the system decides to reject an RFQ in this manner, the user may have the option to require a confirmation.

Typically the server will then determine whether the RFQ may be automatically responded to at step 230. For example, a merchant may desire to not automatically respond to RFQs over a certain dollar amount, as there may be more issues relating to them, such as whether the merchant desires that amount of business and the like. If the rules indicate that the particular RFQ may not be automatically responded to, based upon seller preferences, the server will notify the merchant that an RFQ is present for responding at step 23S. If some amount of automatic response is permitted by the merchant preferences, the server will configure the response to the extent permitted by the merchant, then the server will notify the merchant and provide the partially completed response to the merchant for approval and/or further processing.

If automatic processing is indicated, the server may next determine a product corresponding to the product identifier (i.e., SKU number or the like). Then, the server will access one or more databases (in accordance with the merchant's preferences) to obtain information from the suppliers at step 240, such as ascertaining the merchant's cost of the product. As discussed above, these databases may include a central product database accessible by the server, and may also include communication to remote databases of one or more suppliers to the merchant in order to ascertain real-time cost and availability information. This is particularly desirable for RFQs relating to technology products, which are known for their rapidly changing (and often times falling) prices. In an example embodiment relating to such technology products, supplier databases may include those available via the Internet (but not necessarily over the www) from major distributors, such as Ingram Micro, Tech Data, and Pinacor.

The merchant's preferences contain all necessary details to communicate with the supplier and obtain such price and availability information. Typically, a merchant provides any login/password information necessary for the system to retrieve the information from the supplier's database on behalf of the merchant. Furthermore, the system may have a regularly maintained database that includes pricing and availability information relating to a number of products and from a number of suppliers. It is to be understood that while the process is being discussed in connection with a single product, numerous goods/services within a single RFQ may be processed in like manner, individually or in batch. Further, multiple RFQs may be processed in like manner.

In accordance with the merchant's preferences, if cost and availability information is obtained from more than one supplier, the server will apply the preferences to determine which supplier is to be used in constructing the response to the RFQ at step 250. Based on the cost information of the selected supplier, the server will calculate a bid price for the product at step 260. The bid price is calculated in accordance with the merchant's preferences 15 for determining bid price, which as discussed above, may include a preselected margin over cost, a minimum mark-up, application of any discounts, and the like. Additionally, if multiple units of a product are requested, the extended bid price is also calculated, and may include further discounts, rebates, and the like.

Internally, the server may create a blank template to prepare the automatic response at step 270. The response fields may include merchant identification information, price, availability, delivery, and other such terms, and may also include an open field, so that a standard message from the merchant, such as relating to service or standard terms, may be provided. The server prepares the blank template with any standard, fixed information, such as identification information and standard messages. Further, the server may auto-populate fields relating to the information obtained from the RFQ itself, such as product, quantity and other such information. It is to be understood however that preparing the response form may be performed in any order.

The calculated bid price and any extensions thereof are then entered into the response form. Any other fields required to be included in the response may be filled out in a similar manner. Examples of such fields include delivery information, shipping information, taxes, and the like. Additionally, based on the preferences, the response may include fields for attempting to up-sell/cross-sell additional items to the buyer. However, in an embodiment in which ease of processing is important, such fields may not be present.

Upon finalizing the response, the server determines whether confirmation is required before delivery at step 280. If not, the server electronically delivers notification of the response to the buyer and to the merchant at step 285. As discussed above, in other embodiments, the system may be used to create responses that require approval before delivery. Often times, a merchant will require authorization before delivery of a bid having at least a certain dollar amount of goods/services. In such embodiments, upon completion of the response, the server (or application in the system) will provide notification to the merchant that a response is available for approval at step 290. Such notification may be accomplished in various ways, such as by sending an email, fax, page, telephone message or the like. Further, as with the notification to the buyer, the notification itself may include the response, or it may provide an address from which to review the response. For example, an email may be sent in which a clickable URL is present, so that the merchant may click on the link to access the response. Typically, a notification contains instructions on how the quote can be accessed by the buyer.

Based on seller preferences, criteria for determining whether approval is required may vary. In various embodiments, the seller may require confirmation for all or none of the automatically generated responses, or all responses over a predetermined amount. Also if there has been no approval after a predetermined amount of time after the merchant has been notified, the system may send the response automatically, in certain embodiments. In other embodiments, confirmation may be required for a particular buyer or specified set of buyers, while quotes for other buyers may be sent immediately. Further, if services are part of the quote, a seller may choose to require approval of the quote.

If approval is indicated, after review, the merchant may approve the response by notifying the server that the response is ready for delivery at step 300. The merchant may also print out a copy of the quote and may deliver the response itself Alternately, if the merchant desires to make changes, it can do so by directly editing the response, and delivering the revised response back to the server. In another embodiment, the merchant may choose to change some preferences and recreate the instant quote at step 270. Upon receipt of approval, the server will deliver the response to the buyer, as discussed above, at step 310.

In yet other embodiments in which a merchant desires that only a portion of a response is automatically prepared, the server will send the automatically generated portion (which in an example embodiment, may include merchant identification information or further information, such as discussed above) to the merchant for finalization. Upon finalization, the merchant can directly deliver the response, or may provide the finalized response to the server for further processing and delivery.

It is to be understood that the invention may be embodied in data, a computer readable medium, and the like, such as an application. Further, it is to be understood that the methods disclosed herein may be performed in accordance with computer instructions corresponding to the steps described above, and such a computer program may be any machine-readable storage medium having a set of instructions for causing a computer, such as a general purpose computer, to perform the above-described steps. In particular, the medium may include, for example, magnetic storage medium, including disk and tape storage medium; optical storage medium, including compact disk memory and digital video disk storage medium; nonvolatile memory storage memory; volatile storage medium; and modulated, electronic signals.

Although the above disclosure includes a discussion of both automatic RFQ generation and automatically responding to an RFQ, it is to be understood that in certain embodiments, some or all of only one side of the process is automated. Also, one side (e.g., buyer) may be automated, while only a part of the merchant side is automated. In an embodiment where the RFQ and the quotes remain in the system, the buyer may use tools to compare and evaluate the quotes received.

Although the above embodiments have been described in connection with a server based means of generating a response, it is to be understood that in other embodiments, the response may be generated by a remote workstation to which the merchant has access, such as a personal computer, personal digital assistant, Internet appliance, and the like. For example, it is possible for a buyer to directly send RFQs to one or more merchants. In such a situation, the merchant's workstation may be adapted to automatically respond, in similar manner as discussed above in connection with a server.

While the invention has been described with respect to the embodiments and variations set forth above, these embodiments and variations are examples and the invention is not to be considered limited in scope to these embodiments and variations. Accordingly, various other embodiments and modifications and improvements not described herein may be within the spirit and scope of the present invention, as defined by the following claims and their equivalents.

What is claimed is:

1. A non-transitory, computer readable medium comprising code stored therein and executable by a processor to automatically generate an electronic request for quote (RFQ) in response to an electronic RFQ generation request, wherein the code to automatically generate the electronic RFQ comprises code for:
receiving electronic product selection data representing one or more selected products and a quantity for each selected product to be included in the RFQ, wherein each of the products are offered via one or more web pages generated by a second computer system;
receiving an electronic RFQ generation request with the first computer system from a user of a client computer system to automatically generate said electronic RFQ, wherein the RFQ generation request includes product selection data indicating a selection of one or more products by the user and the RFQ generation request is received in response to selection by the user of an electronically selectable user interface component provided to the client computer system by the second computer system to allow the user to request generation of the electronic RFQ generation request; and
in response to the electronic RFQ generation request, executing code in the first computer system to cause the first computer system to:
process the product selection data;
process the electronic RFQ generation request;
access a database that includes user profile data and user RFQ fulfillment related preference data;
automatically generate an electronic RFQ associated with the selected one or more products in accordance with the product selection data, the user profile data, and the user RFQ fulfillment related data;
automatically select one or more merchants to receive the RFQ; and
sending the automatically generated RFQ to the selected one or more merchants.

2. The computer readable medium of claim 1 wherein the code is further executable by the processor for:
receiving a response to the electronic RFQ from at least one of the merchants, wherein the response to the electronic RFQ from at least one of the merchants comprises product quantity, price, and merchant information.

3. The computer readable medium of claim 2 wherein the code is further executable by the processor for:
automatically populating data fields of the response with predetermined merchant profile and preference data.

4. The computer readable medium of claim 2 wherein the code is further executable by the processor for:
preparing the response and electronically sending the response completely automatically without merchant intervention.

5. The computer readable medium of claim 4 wherein the code is further executable by the processor for:
preparing a response to the electronic RFQ, wherein preparing the response further comprises:
assessing price information of a product corresponding to the selected one or more products including accessing at least one database of a supplier of the responding merchant, the database having price and availability information regarding the product from the supplier of the merchant, to ascertain a cost of the product from the supplier.

6. The computer readable medium of claim 3 wherein the electronically selectable user interface component allows the user to create an instant RFQ for at least one selected product.

7. The computer readable medium of claim 3 wherein the code is further executable by the processor for:
receiving a response to the RFQ from at least one of the merchants to whom the RFQ was sent.

8. An apparatus comprising:
a processor; and
a medium comprising code stored therein code stored therein and executable by a processor to automatically generate an electronic request for quote (RFQ) in response to an electronic RFQ generation request, wherein the code to automatically generate the electronic RFQ comprises code for:
receiving electronic product selection data representing one or more selected products and a quantity for each selected product to be included in the RFQ, wherein each of the products are offered via one or more web pages generated by a second computer system;
receiving an electronic RFQ generation request with the first computer system from a user of a client computer system to automatically generate said electronic RFQ, wherein the RFQ generation request includes product selection data indicating a selection of one or more products by the user and the RFQ generation request is received in response to selection by the user of an electronically selectable user interface component provided to the client computer system by the second computer system to allow the user to request generation of the electronic RFQ generation request; and in response to the electronic RFQ generation request, executing code in the first computer system to cause the first computer system to:

process the product selection data;

process the electronic RFQ generation request;

access a database that includes user profile data and user RFQ fulfillment related preference data;

automatically generate an electronic RFQ associated with the selected one or more products in accordance with the product selection data, the user profile data, and the user RFQ fulfillment related data;

automatically select one or more merchants to receive the RFQ; and sending the automatically generated RFQ to the selected one or more merchants.

9. The apparatus of claim 8 wherein the code is further executable by the processor for:

receiving a response to the electronic RFQ from at least one of the merchants, wherein the response to the electronic RFQ from at least one of the merchants comprises product quantity, price, and merchant information.

10. The apparatus of claim 9 wherein the code is further executable by the processor for:

automatically populating data fields of the response with predetermined merchant profile and preference data.

11. The apparatus of claim 9 wherein the code is further executable by the processor for:

preparing the response and electronically sending the response completely automatically without merchant intervention.

12. The apparatus of claim 9 wherein the code is further executable by the processor for:

preparing a response to the electronic RFQ, wherein preparing the response further comprises:

assessing price information of a product corresponding to the selected one or more products including accessing at least one database of a supplier of the responding merchant, the database having price and availability information regarding the product from the supplier of the merchant, to ascertain a cost of the product from the supplier.

13. The apparatus of claim 8 wherein the electronically selectable user interface component allows the user to create an instant RFQ for at least one selected product.

14. The apparatus of claim 8 wherein the code is further executable by the processor for:

receiving a response to the RFQ from at least one of the merchants to whom the RFQ was sent.

* * * * *